United States Patent Office 3,524,903
Patented Aug. 18, 1970

3,524,903
FLAME-RETARDANT VINYL ESTER CONTAINING ALKYL HYDROGEN PHOSPHATE RESIN AND A HALOGENATED EPOXIDE RESIN
Sampse R. Hargis, Jr., Brazoria, Tex., assignor to The Dow Chemical Company, Midland, Mich., a corporation of Delaware
No Drawing. Filed Jan. 22, 1968, Ser. No. 699,321
Int. Cl. C08g 45/04; C07f 9/02
U.S. Cl. 260—837                                23 Claims

ABSTRACT OF THE DISCLOSURE

A flame retardant vinyl ester resin incorporating both phosphorus and halogen is prepared from a mixture of polyepoxide resins, wherein at least one of which resins preferably is a halogen containing polyepoxide resin, an ethylenically unsaturated carboxylic acid and a flame retardant amount of certain alkyl hydrogen phosphate esters. Diluted with a polymerizable monomer, the vinyl ester resin is useful in preparing a variety of reinforced plastic objects, molded articles, etc.

BACKGROUND OF THE INVENTION

This invention relates to flame retardant vinyl ester resin compositions. More particularly it relates to resin compositions containing both phosphorus and halogen and to a process for making same. Further the invention relates to the incorporation of certain alkyl hydrogen phosphate esters into said vinyl ester resins.

Flame retardant or self-extinguishing characteristics are imparted to thermoplastic and thermosettable resins by incorporating halogens, notably chlorine or bromine, into the polymer or by the addition of halogen containing additives, by the addition of various oxides such as antimony trioxide, by the addition of various phosphate esters, and the like. Many of the phosphates are also plasticizers, resulting in an overall loss in physical property values. Additionally, the high levels of halogen usually required also detract from the final cured physical properties.

SUMMARY OF THE INVENTION

Accordingly this invention provides a process for preparing flame retardant or self-extinguishing vinyl ester resins wherein the combination of phosphorus, provided by an alkyl hydrogen phosphate ester, and a halogen, principally provided by a halogen containing polyepoxide resin, provided excellent flame retardant properties without detracting from the physical properties of the cured resin.

Vinyl ester resins are a new class of thermo-settable resins which have more recently become commercially available. Such resins may be generally described as the reaction product of a polyepoxide resin having more than one oxirane group per molecule with an unsaturated carboxylic acid wherein the two reactants are combined in essentially equal equivalent ratios. Vinyl ester resins are more fully described, for example, in the application of C. R. Bearden, Ser. No. 373,102, filed on June 5, 1964 now Pat. No. 3,367,992. The vinyl ester resins of this invention chemically combine the alkyl hydrogen phosphate ester by reacting the free acid groups with a portion of the polyepoxide resin and the balance of the polyepoxide resins is reacted with an unsaturated carboxylic acid.

DETAILED DESCRIPTION

Generally, the process may be conducted either as a batch operation or as a step-wise reaction. In a batch process the reactants are mixed together and then heated until the resulting acid content, as —COOH, falls below about 1 percent by weight. In a step-wise process the alkyl hydrogen phosphate ester is preferably reacted with a portion of the polyepoxide resin first, until the acid content, as —COOH, is below about ½ percent by weight. Then additional polyepoxide is added along with an ethylenically unsaturated carboxylic acid and reacted until the final acid content is below about 1 percent by weight. The vinyl ester resin prepared by either process may then be diluted with a polymerizable monomer containing a >C=CH$_2$ group. The reaction, either batch or stepwise, may be run with or without a solvent as desired.

Advantageously, a polymerization inhibitor such as hydroquinone and an epoxide/acid catalyst such as 2,4,5-tri-(dimethylaminomethyl) phenol, amine salts, quaternary hydroxides or salts, and the like may be added to the mixture. The reactions may be conducted over a wide temperature range but preferably over a range of about 80° C. to about 120° C.

The alkyl hydrogen phosphate ester has the general formula

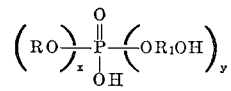

wherein R is a lower alkyl group of 1–5 carbon atoms or a radical having the formula

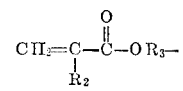

wherein R$_2$ is hydrogen or methyl and R$_3$ is a bivalent alkyl group having from 2 to about 4 carbon atoms; R$_1$ is a bivalent alkyl group having from 2 to about 4 carbon atoms or said alkyl group further containing a halogen group; when $x$ is 1, $y$ is 1 and when $x$ is 2, $y$ is 0. The alkyl hydrogen phosphate esters are generally used as a mixture since there is no particular advantage in purifying or separating these specific esters. It is to be understood that the mixtures may contain certain trialkyl phosphate esters.

The phosphate esters are generally prepared by first reacting about 3 moles of an alcohol with 1 mole of P$_2$O$_5$, and then reacting about 1.5 moles of an alkylene oxide per original mole of P$_2$O$_5$. The reaction temperature in the first stage is controlled below about 45° C., and the P$_2$O$_5$ is usually added sequentially in small portions to the alcohol. The second stage reaction temperature is also controlled, preferably below about 55° C. The reaction may be run under pressure and pressure is desirable when volatile alkylene oxides are utilized. The reaction is continued until the free acid content remaining after the first stage is reduced to about one-half its original value.

Suitable alcohols include the lower alcohols having from 1 to about 5 carbon atoms such as ethyl alcohol, n-butyl alcohol and the like and hydroxyalkyl acrylate or methacrylate such as hydroxyethyl acrylate, 2-hydroxypropyl methacrylate and the like. Suitable alkylene oxides include ethylene oxide, propylene oxide, epihalohydrins such as epichlorohydrin, and the like.

Any of the known polyepoxides can be employed in the preparation of the thermosetting resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one epoxide group per molecule. The polyepoxides may be monomeric or polymeric.

The polyepoxides referred to as epoxidized diolefins, epoxidized fatty acids, etc. are generally made by the known peracid method where the reaction is one of epoxidation of compounds with isolated double bonds at a controlled temperature so that the acid resulting from the peracid does not react with the resulting epoxide group to form ester linkages and hydroxyl groups. Preparation of polyepoxides by the peracid method is described in various periodicals and patents and such compounds as butadiene, ethyl linoleate, polyunsaturated drying oils or drying oil esters can all be converted to polyepoxides.

While the invention is applicable to epoxides generally, preferred polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

The ethylenically unsaturated carboxylic acids useful in preparing the resin compositions of this invention include the $\alpha,\beta$-unsaturated monocarboxylic acids such as acrylic acid, methacrylic acid, the halogenated acrylic or methacrylic acids, cinnamic acid and the like and mixtures thereof, and the hydroxyalkyl arylate or methacrylate half esters of dicarboxylic acids wherein the hydroxyalkyl group preferably has from 2 to 6 carbon atoms. The dicarboxylic acids may be of both the ethylenic unsaturated type and those without ethylenic unsaturation. Preferably, the half ester is prepared by reacting substantially equal molar proportions of a hydroxyalkyl acrylate or methacrylate with a dicarboxylic acid anhydride. Advantageously, a polymerization inhibitor, such as hydroquinone, may be added since elevated temperatures are useful in preparing the half esters.

Dicarboxylic acid anhydrides containing ethylenic unsaturation suitable for preparing the half esters include maleic anhydride, the halogenated maleic anhydrides, citraconic anhydride, itaconic anhydride and the like and mixtures thereof. The saturated dicarboxylic acid anhydrides include phthalic anhydride, tetrabromophthalic anhydride, chlorendic anhydride, anhydrides of aliphatic unsaturated dicarboxylic acids and the like.

The halogen content of the resin compositions of this invention is conveniently obtained by utilizing a halogen containing polyepoxide resin. Generally a halogenated polyhydric alcohol or phenol, such as tetrabromo bisphenol A is utilized to prepare the halogen containing polyepoxide resin. However, polyepoxide resins prepared as previously described may also be halogenated by known methods to introduce the halogen atom into the polyepoxide resins. Preferably the halogen is bromine and/or chlorine.

Sufficient halogen containing polyepoxide resin is used to provide from about 10 to 20 percent by weight of halogen, based on the final resin solids, and the balance of the polyepoxide resin needed to prepare the vinyl ester resin may be selected from any of the previously recited non-halogen containing polyepoxides. In the two-step reaction process the order of reaction of the polyepoxides is not critical, but it is more convenient to react the alkyl hydrogen phosphate esters with a low molecular weight, liquid polyepoxide in the first stage to be followed in the second stage by reaction with a halogen containing polyepoxide and other reactants previously cited.

In addition to the halogen content the resin contains a sufficient amount of the phosphate esters to obtain the desired flame retardant or self-extinguishing properties. Generally, the phosphorus content will range from about 0.8 to about 2 percent by weight, based on the total resin solids.

The proportions of total polyepoxides to total acids ranges from about 0.9 to about 1.2 equivalents of epoxides for each equivalent of acids. Preferably, the total equivalents of epoxides is about equal to the total equivalents of acids. It is to be understood that equivalents of acids includes both the carboxylic acids and the phosphate acids.

A polymerizable monomer may be blended with the resin although the resin is useful without a monomer diluent. Generally, the resin is diluted with a monomer in the proportions of up to about 50 percent by weight monomer with the balance to make 100 percent comprising said resin.

A wide selection of polymerizable monomers containing a $>C=CH_2$ group is available from the many known classes of vinyl monomers. Represesentative species are the vinyl aromatic compounds which include such monomers as styrene, vinyl toluene, halogenated styrenes, divinyl benzene and the like.

Other valuable monomers include the methyl, ethyl, isopropyl, octyl, etc. esters of acrylic acid or methacrylic acid; vinyl acetate, diallyl maleate, dimethallyl fumarate; acidic monomers such as acrylic acid, methacrylic acid and the like; and amide monomers such as acrylamide, N-alkyl acrylamides and the like and mixtures thereof.

Preferred polymerizable monomers containing the $>C=CH_2$ group are styrene, vinyl toluene, ortho-, meta- and para-halostyrenes, vinyl naphthalene, the various alpha-substituted styrenes, as well as the various di-, tri- and tetrahalo styrenes, and acrylic, methacrylic and crotonic acid esters which include both the saturated alcohol esters and the beta-hydroxyalkyl esters.

According to the present invention, the curing of the resin compositions is effected by the application of heat and/or pressure in the presence of a free radical yielding catalyst. Catalysts that may be used for the curing or polymerization are preferably the peroxide catalyst such as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of reactants. Temperatures employed may vary over a considerable range but usually are in the range of 60° to 250° C.

Additionally, more rapid curing of the thermosetting resin compositions may be accomplished by the addition of accelerating agents such as lead or cobalt naphthenate, dimethyl aniline and the like usually in concentrations ranging from 0.1 to 5.0 weight percent.

The following non-limiting examples serve to illustrate the invention. All parts and percentages are by weight unless otherwise specified.

Resins and reactants utilized in the following examples include:

Polyepoxide A—A semi-solid resin prepared from tetrabromo bisphenol A and epichlorohydrin having an epoxide equivalent weight of about 350–400 and a bromine content of about 44–48%.

Polyepoxide B—A liquid resin prepared from bisphenol A and epichlorohydrin having an epoxide equivalent weight of 186–192.

DMP-30 refers to the epoxide/acid catalyst 2,4,5-tri-(dimethylaminomethyl) phenol.

MHE—A maleate half-ester prepared by reacting about equal molar quantities of maleic anhydride and hydroxyethyl acrylate. For convenience, this half-ester will be identified as MHE hereinafter.

EXAMPLE 1

An alkyl hydrogen phosphate was prepared in a suitable reactor by first reacting 16.9 lbs. of n-butyl alcohol with 10.8 lbs. of $P_2O_5$. The alcohol was cooled to about 10° C. and purged with nitrogen before the $P_2O_5$ was added. The $P_2O_5$ was added over a 145 minute period while maintaining the reaction temperature below about 45° C. The mixture was digested an additional 85 minutes to ensure reaction of the $P_2O_5$.

Then 6.7 lbs. of propylene oxide was added during a 75 minute period over a temperature range of 6 to 28° C. The resin mixture was then digested an additional 30 minutes at 45° C. After reaction the pressure was reduced to 20 mm. Hg to remove unreacted oxide, etc., cooled and filtered.

The phosphate ester contained 15.8% unreacted acid, as —COOH (calculated, 14.8%) and 14.4% phosphorus (calculated, 13.7%). The product had a density of 1.10043 at 25° C. and a viscosity of 202 cs. at 25° C.

A vinyl ester resin containing the above phosphate ester was prepared by changing to a suitable reactor 78 gms. of the above phosphate, 0.2 gm. of hydroquinone, 1.65 mls. of DMP-30 and 245 gms. of polyepoxide B. The mixture was heated to 50° C. until the percent acid content, as —COOH, was 0.5% (about 2 hours). Then 465 gms. of MHE and 412 gms. of polyepoxide A was added and reacted at 110–112° C. until the acid content was about 1.2%.

The resin was cooled and 520 gms. of styrene blended with the resin to produce a light, straw colored liquid vinyl ester resin having a density of 1.2201 at 25° C. and a viscosity of 1094 at 25° C. The resin was readily polymerized with 1% benzoyl peroxide at 180° F. At a concentration of 1% cobalt naphthenate and 1.5% methyl ethyl ketone peroxide a gel was obtained in 17 minutes and a peak temperature of 350° F. in 24 minutes.

EXAMPLE 2

In a manner similar to that of Example 1 an alkyl hydrogen phosphate ester was prepared by reacting 184 gms. ethanol with 142 gms. $P_2O_5$ followed by reaction with 87 gms. propylene oxide. The final phosphate ester contained 18.2% acid, as —COOH, and 16.1% phosphorus, and it had a density of 1.18144 at 25° C. and a viscosity of 125 cs. at 25° C.

Similarly, a vinyl ester resin was prepared by first reacting 60 gms. of the above phosphate, 237 gms. of polyepoxide B, 0.25 gm. hydroquinone and 1.6 mls. DMP-30 at 60° C. until the acid content was about 0.1%. Then 412 gums. of polyepoxide A and 484 gms. MHE was added and reacted at 110° C. for about 6¼ hours until the acid content was about 1.6%. The resin was then blended with 520 gms. of styrene while cooling to ambient temperature. The product had a density of 1.2015 at 25° C. and a viscosity of 721 cs. at 25° C.

A resin with similar properties is obtained when the alkyl hydrogen phosphate ester is reacted simultaneously with the MHE and the polyepoxide resins.

EXAMPLE 3

Similar to Example 1 a phosphate ester was prepared by reacting 41.2 lbs. of hydroxyethylacrylate with 17.2 lbs. of $P_2O_5$ followed by reaction with 8.0 lbs. of ethylene oxide. Product contained 13.0% free acid and 10.6% phosphorus, and it had a density of 1.3436 at 25° C.

Similarly, a vinyl ester resin was obtained by first reacting 5.48 lbs. of the above phosphate ester, 6.8 gms. hydroquinone, 42 mls. DMP-30 and 13.25 lbs. of polyepoxide B at 60° C. until the acid content was about 0.44%. Then 27.25 lbs. of MHE and 24.1 lbs. of polyepoxide A was added and reacted at 110° C. for 9 hours to an acid content of about 1.65%. Then 29.5 lbs. of styrene was blended with the resin while cooling to ambient temperature. Product had a density of 1.21964 at 25° C. and a viscosity of 2,657 cs. (30% styrene) and 474 cs. (40% styrene).

Similar results are obtained if an equivalent amount of acrylic or methacrylic acid is used in place of the maleate half ester (MHE).

The vinyl ester resins of Examples 1, 2 and 3 were used to prepare ⅛ inch thick clear castings by adding 1% benzoyl peroxide and curing by heating for 16 hours at 80° C. followed by a post cure at 250° F. for 45 minutes. Physical property tests were then made and the results recorded in Table I.

Likewise ⅛ inch thick, 3 ply glass laminates were prepared using 1½ ounce glass mats, 1% benzoyl peroxide as catalyst, and cured at 210° F. for 10 minutes followed by a post cure at 250° F. for 30 minutes. Flame retardant tests were made according to the Globar method, ASTM D–757–49, and the results recorded in Table I. The percent phosphorus and bromine in the examples was constant at about 0.583% P and 11.6% Br.

TABLE I

| Property | Example No. | | |
|---|---|---|---|
| | 1 | 2 | 3 |
| Flexural strength, p.s.i. | 20,300 | 20,000 | 20,300 |
| After 2 hrs. water boil | 12,800 | 13,100 | 15,400 |
| Flexural modulus ×10⁵ | 5.0 | 4.87 | 5.07 |
| After 2 hrs. water boil | 4.5 | 4.25 | 4.7 |
| Tensile, p.s.i. | 12,000 | 11,000 | 11,900 |
| Elongation, percent | 4.4 | 3.0 | 3.4 |
| Heat distortion temperature, ° F | 194 | 191 | .214 |
| Toluene absorption (24 hrs.), wt. percent | .078 | .016 | .027 |
| Water absorption (24 hrs.), wt. percent | .145 | .158 | .169 |
| Burn rate, inches/min | .105 | .132 | .104 |

The flame retardant or self-extinguishing vinyl ester resins of this invention are useful in preparing a variety of plastic and reinforced plastic objects. The flame retardant properties make the resin of particular value and importance to the construction industry wherein building codes and other government regulations require certain flame retardant properties. Of course, the value of flame retardancy is useful in other than the construction industry, in areas such as toys, household articles, industrial and outer space environments and the like.

It is to be understood that the commonly used and available additives can be added to the resins, additives such as fillers, including clay, minerals, etc., mold release agents, colorants, etc. The invention also contemplates that at least a portion of the halogen requirement may be provided by certain dibasic acids or anhydrides such as chlorendic anhydride, by certain halogen containing monomers including the various mono- and poly-halo styrenes and the like.

While certain features of this invention have been described in detail, it will be apparent, of course, that modifications can be made which are within the scope and spirit of this invention. It is not intended to limit the invention to the exact details of the examples provided except as they are defined in the following claims.

What is claimed is:

1. A process for preparing a flame retardant, thermosettable vinyl ester resin which comprises
   (a) mixing an alkyl hydrogen phosphate ester and an ethylenically unsaturated carboxylic acid with a halogen containing polyepoxide resin or a mixture of polyepoxide resins wherein at least one resin in the mixture is a halogen containing polyepoxide resin; said reactants present in the proportion of about 0.9 to about 1.2 equivalents of epoxide per equivalent of acid wherein the acid equivalent includes both the hydrogen phosphate ester and the carboxylic acid; and said mixture prepared to contain from about 0.8 to about 2 weight percent of phosphorus and from about 10 to about 20 weight percent of halogen; and
   (b) reacting said mixture until the acid content, as —COOH, falls below about 1 percent by weight; said alkyl phosphate having the formula

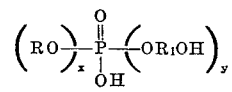

wherein R is a lower alkyl radical of 1 to about 5 carbon atoms or a radical of the formula,

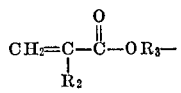

wherein $R_2$ is hydrogen or methyl and $R_3$ is a bivalent alkyl group of 2 to about 4 carbon atoms; $R_1$ is the same as $R_3$ or a bivalent halogenated alkyl group of 2 to about 4 carbon atoms; and when $x$ is 1, $y$ is 1 and when $x$ is 2, $y$ is 0.

2. The process of claim 1 wherein said phosphate ester is a mixture of esters.

3. The process of claim 1 further comprising the step of blending a polymerizable monomer having a $>C=H_2$ group in the proportions of up to about 50 percent by weight monomer and the balance, to make 100 percent, of said vinyl ester resin.

4. The process of claim 1 further comprising the step of separately reacting the alkyl hydrogen phosphate ester with a portion of the polyepoxide resin before addition to the mixture of reactants.

5. The process of claim 1 wherein said carboxylic acid is a half-ester of an unsaturated dicarboxylic acid and a hydroxyalkyl acrylate or methacrylate wherein the alkyl group has from 2 to about 4 carbon atoms.

6. The process of claim 5 wherein said carboxylic acid is a maleate half-ester of hydroxyethyl acrylate.

7. The process of claim 1 wherein said halogen containing polyepoxide is a glycidyl polyether of tetrabromo bisphenol A.

8. The process of claim 1 wherein said polyepoxide resin mixture includes a glycidyl polyether of a polyhydric phenol.

9. The process of claim 1 wherein R in said ester is n-butyl and $R_1$ is

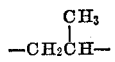

10. The process of claim 1 wherein R in said ester is ethyl and $R_1$ is

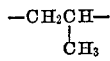

11. The process of claim 1 wherein R in the phosphate ester is

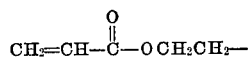

and $R_1$ is —$CH_2CH_2$—.

12. A flame retardant, vinyl ester resin which comprises the product of reaction of (a) an alkyl hydrogen phosphate ester having the formula

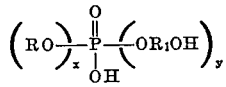

wherein R is a lower alkyl radical of 1 to about 5 carbon atoms or a radical of the formula,

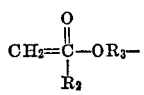

$R_2$ is hydrogen or methyl and $R_3$ is a bivalent alkyl group of 2 to about 4 carbon atoms; $R_1$ is the same as $R_3$ or a bivalent halogenated alkyl group of 2 to about 4 carbon atoms; and when $x$ is 1, $y$ is 1 and when $x$ is 2, $y$ is 0; and (b) an ethylenically unsaturated carboxylic acid; with (c) a halogen containing polyepoxide resin or a mixture of polyepoxide resins wherein at least one resin in the mixture is a halogen containing polyepoxide resin;

said reactants combined in the proportions of about 0.9 to about 1.2 equivalents of epoxide per equivalent of acid wherein the acid equivalents include both the hydrogen phosphate ester and the carboxylic acid; and said resin having an acid content, as —COOH, below about 1 percent by weight and containing from about 0.8 to about 2 percent by weight phosphorus and about 10 to about 20 percent by weight of halogen.

13. The composition of claim 12 wherein said phosphate ester is a mixture of esters.

14. The composition of claim 12 further comprising up to about 50 percent by weight of a polymerizable monomer having a $>C=CH_2$ group and the balance, to make 100 percent, of said vinyl ester resin.

15. The composition of claim 14 wherein said monomer is an aromatic vinyl monomer.

16. The composition of claim 15 wherein said monomer is styrene.

17. The composition of claim 12 wherein said carboxylic acid is a half-ester of an unsaturated dicarboxylic acid and a hydroxyalkyl acrylate or methacrylate wherein the alkyl group has from 2 to about 4 carbon atoms.

18. The composition of claim 17 wherein said carboxylic acid is a maleate half-ester of hydroxyethyl acrylate.

19. The composition of claim 12 wherein said halogen containing polyepoxide is a glycidyl polyether of tetrabromo bisphenol A.

20. The composition of claim 12 wherein said polyepoxide resin mixture includes a glycidyl polyether of a polyhydric phenol.

21. The composition of claim 12 wherein R in said ester is n-butyl and $R_1$ is

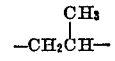

22. The composition of claim 12 wherein R in said ester is ethyl and $R_1$ is

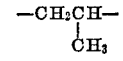

23. The composition of claim 12 wherein R in the phosphate ester is

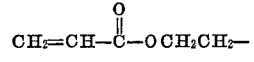

and $R_1$ is —$CH_2CH_2$—.

References Cited

UNITED STATES PATENTS

| | | | |
|---|---|---|---|
| 2,831,838 | 4/1958 | Fekete | 260—80 |
| 2,849,418 | 8/1958 | Fang | 260—836 |
| 3,346,545 | 10/1967 | Sehm | 260—80 |

PAUL LIEBERMAN, Primary Examiner

U.S. Cl. X.R.

260—836, 80, 47, 952, 18, 23, 78.4, 835

PO-1050
(5/69)

UNITED STATES PATENT OFFICE
CERTIFICATE OF CORRECTION

Patent No. 3,524,903        Dated August 18, 1970

Inventor(s) Sampse R. Hargis, Jr.

It is certified that error appears in the above-identified patent and that said Letters Patent are hereby corrected as shown below:

Column 7, line 15, delete the formula and rewrite as follows:
$$>C = CH_2$$

SIGNED AND
SEALED
MAR 2 1971

(SEAL)
Attest:

Edward M. Fletcher, Jr.
Attesting Officer

WILLIAM E. SCHUYLER, JR.
Commissioner of Patents